April 22, 1952  S. MOLEDZKY  2,594,196
BURGLAR ALARM FOR VEHICLES AND THE LIKE
Filed March 7, 1947  3 Sheets-Sheet 1
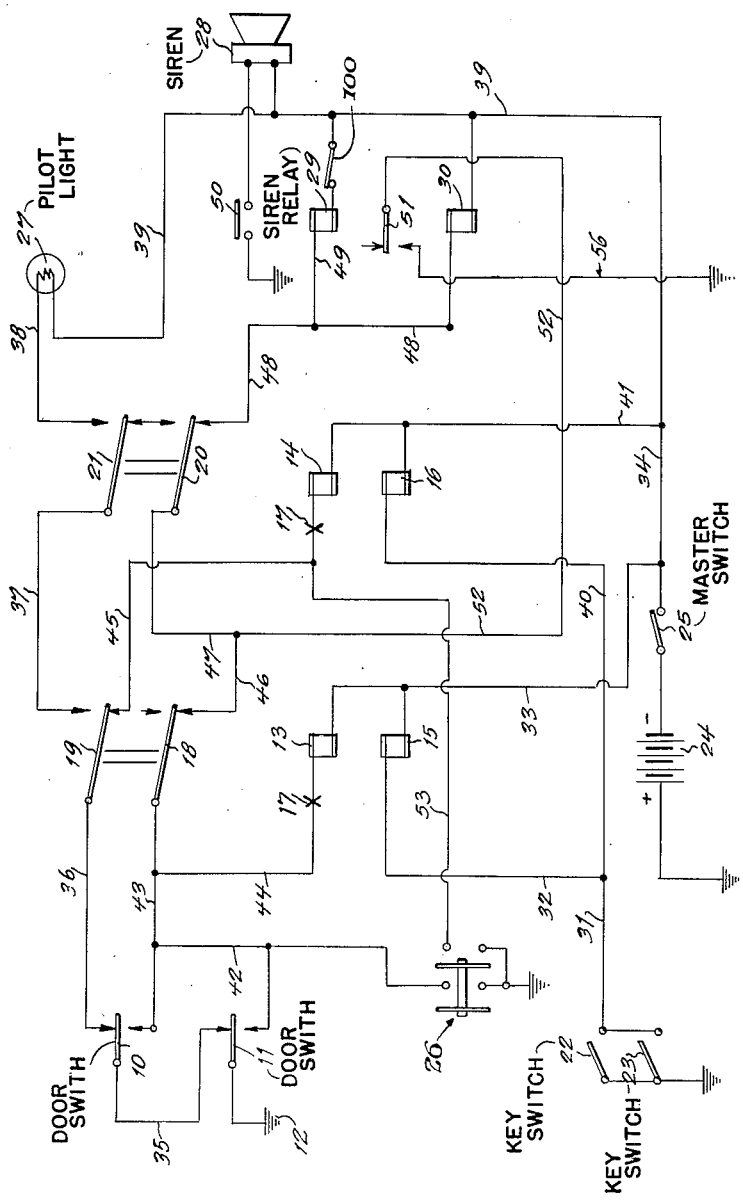
INVENTOR
SYDNEY MOLEDZKY
BY George L. Weed
ATTORNEY

April 22, 1952 S. MOLEDZKY 2,594,196
BURGLAR ALARM FOR VEHICLES AND THE LIKE
Filed March 7, 1947 3 Sheets-Sheet 2
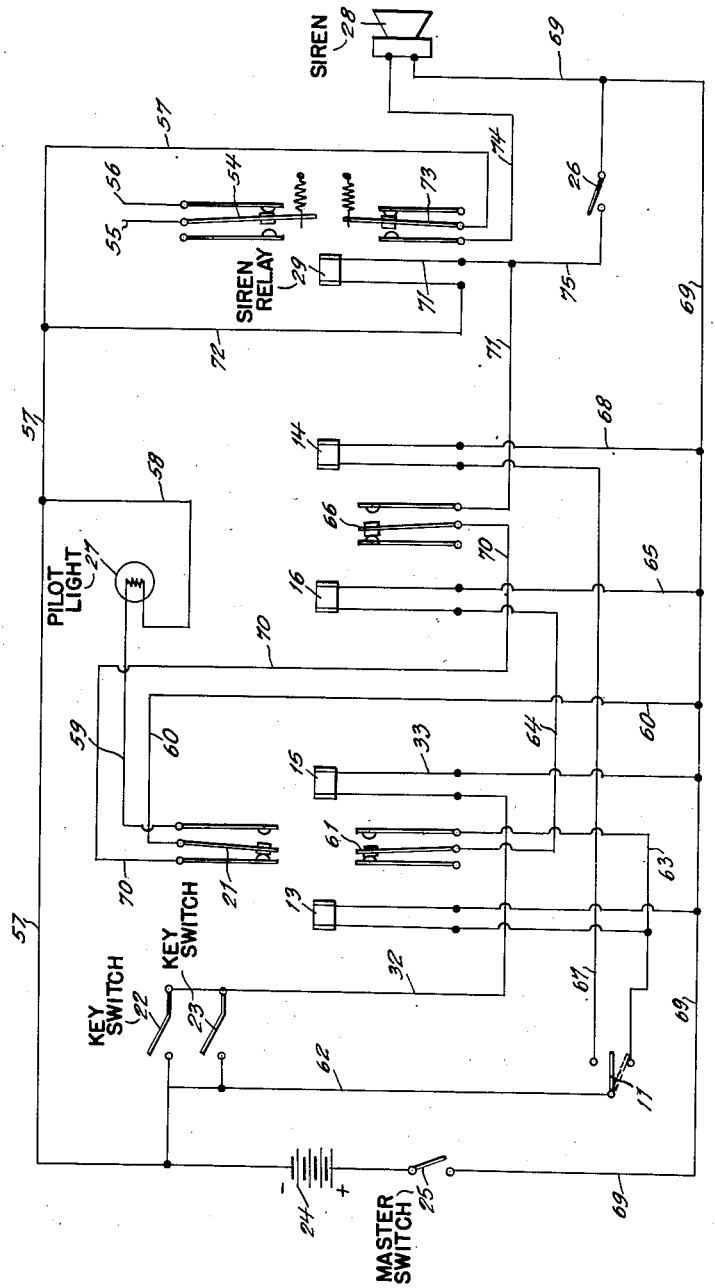

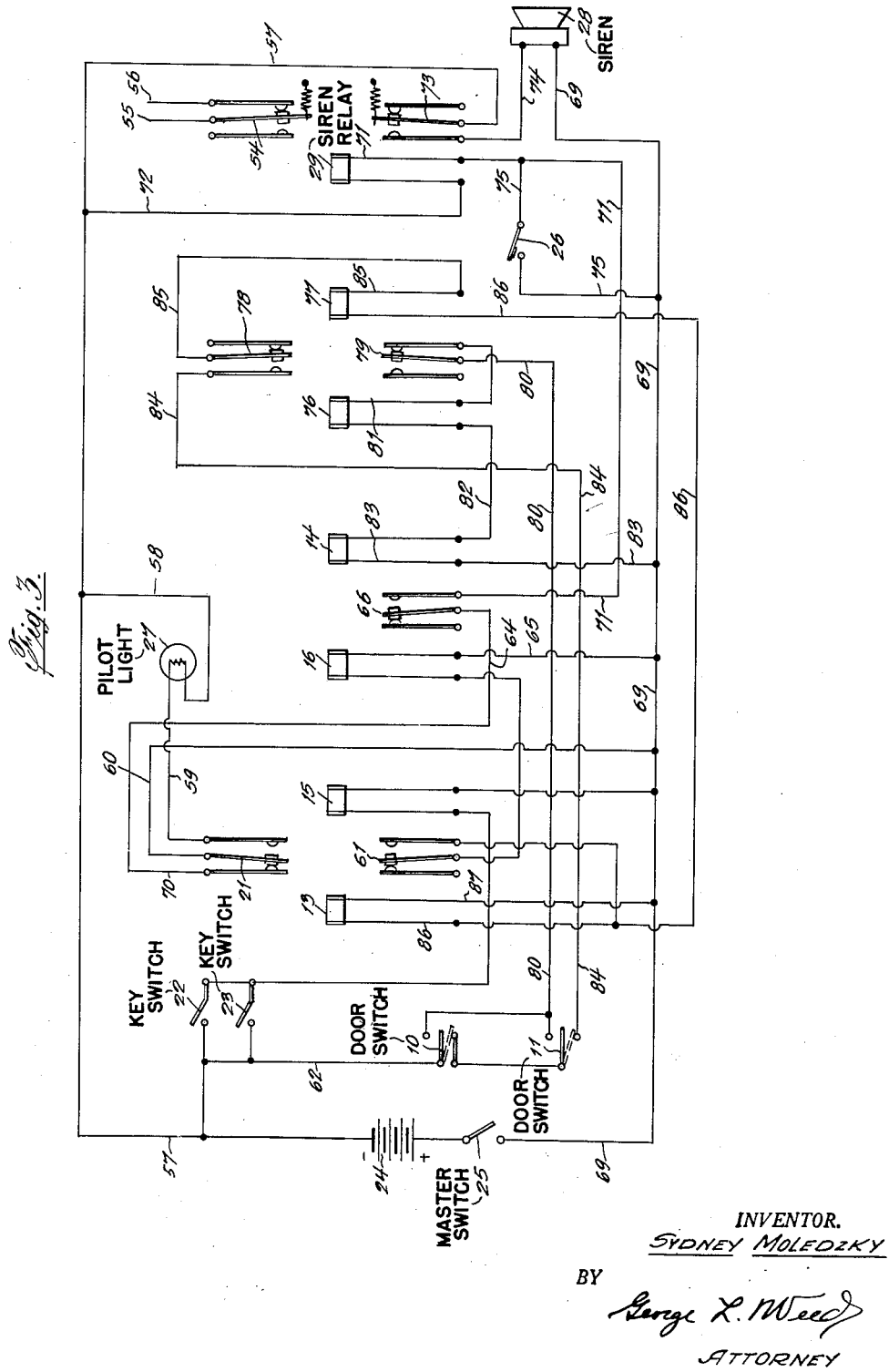

Patented Apr. 22, 1952

2,594,196

UNITED STATES PATENT OFFICE 2,594,196

BURGLAR ALARM FOR VEHICLES AND THE LIKE

Sydney Moledzky, Brooklyn, N. Y.

Application March 7, 1947, Serial No. 732,985

5 Claims. (Cl. 177—314)

The invention relates to new and useful improvements in alarm devices and has especial reference to such devices as are useful on trucks, passenger cars and the like for the purpose of giving an alarm under certain specified conditions.

An object of the invention is to provide a simple, efficient, durable and economically manufactured device which can be readily installed on vehicles and adapted to instantly sound an alarm when the doors are operated in an improper manner and by unauthorized persons.

A further object is to provide a device in which the alarm system is at all times under control of the driver so that he can set it and cut off the alarm system at will either from the inside or outside of the vehicle.

A still further object is to provide a device which will permit the driver to open and close doors at will without sounding the alarm but which will cause the alarm to sound when any door is opened after certain parts have been set by the driver either when in or outside of the car.

Further and more specific objects, features and advantages will more clearly appear from the detailed specification hereinafter set forth especially when taken in connection with the accompanying drawings which illustrate several present preferred forms which the invention may assume and which form part of the specification.

In brief and general terms the invention includes a combination of key-operated switches and contact relays associated with door switches, a pilot light and a siren or alarm device in such manner that the alarm can be controlled under a variety of conditions which make the device adaptable for use in actual practice for most all circumstances under which such an alarm device would be of utility.

In particular the device includes key-operated switches in combination with door-operated switches so that after a key-operated switch is set, the system is put in operative condition when the doors are closed and operated when any door thereafter is opened.

Furthermore, the system includes such above means so related that when the driver is in the car and one tries to open a door, the alarm will sound and permits the operator to operate the alarm without opening any door when he is apprised of attempts to rob the vehicle of its contents.

The invention yet further includes the use of different kinds of switches and relays which, while operating on the same basic principle, are adapted to different conditions of use for various purposes as will be hereinafter set forth.

The present preferred form which the invention may assume is shown in the drawings, of which Fig. 1 is a schematic diagram of the apparatus and circuit connections of one form in which key-operated switches and latch-type momentary-contact relays are employed;

Fig. 2 is a similar diagram in which momentary-contact door switches are employed with latch-type relays;

Fig. 3 is a similar diagram in which single-pole double-throw door switches are employed in conjunction with a double-pole, double-throw latch relay as a momentary door contact device.

Similar characters of reference indicate corresponding parts in the several views.

Before explaining in detail the present improvement and mode of operation thereof, it is to be understood that the invention is not limited to the details of construction illustrated in the accompanying drawings, since the invention is capable of other embodiments and only the principle thereof and best mode, which has been contemplated, of applying that principle, has been set forth.

Referring now merely to the particular construction and operation of the forms shown in the drawings, reference to Fig. 1 shows this form to include door switches represented by arms 10 and 11 which have upper and lower contacts and are in series with a ground 12 when the doors are closed and are in engagement with their upper contacts, and are in parallel when the doors are open and the arms are in engagement with the lower contacts.

Then there are two momentary-contact relays having operating coils 13 and 14 and re-set coils 15 and 16 of a well known type in which the operating coils, when energized, cause a break in their circuit at 17 to cut off the current to them after they are operated and avoid waste of power. These relays latch up when operated and remain that way until the re-set coils are energized. The coils 13 and 15 operate switch arms 18 and 19 and the coils 14 and 16 operate switch arms 20 and 21. When the coils 13 and 14 are operated the respective arms are moved downward to an operative position and when the coils 15 and 16 are operated the arms are moved to an upward re-set position.

Elsewhere in the circuit there are two key-operated switch arms 22 and 23, one disposed inside the vehicle and the other disposed somewhere outside so that it can be operated even when the doors are closed. There are also the battery 24, a main switch 25, an alarm button 26, a pilot light 27, a siren 28, a siren relay 29, and a siren-locking relay 30. The relation of these parts and their operation will now be described.

Assuming the driver is outside the car with the doors shut and wishes to open the doors without setting off the alarm, he operates the outside key-operated switch such as 23 which will energize coils 15 and 16 of the first and second relays and reset the arms 18, 19, 20 and 21 to their upper position. This takes place over the circuits from ground through arm 23, wires 31 and 32, coil 15, wires 33 and 34, through master switch 25, now closed, battery 24 back to ground, and likewise from arm 23, wires 31 and 40, coil 16, wires 41 and 34, through master switch 25, back to battery. He can then open any door and nothing will happen. Similarly if he is inside the car with the doors closed and the alarm set, he can get out by opening a door after he has operated the inside key-operated switch 22. Switches 22, 23, are of the spring contact type and are closed momentarily by manually turning a key, thereby completing the alarm resetting circuits. Removal of turning pressure on the key opens switches 22, 23. When the arms 18 and 19 move upward the arm 19 establishes a circuit from ground, door switch arm 11, wire 35, door arm 10, wire 36, contact arm 19 upper position, wire 37, switch arm 21 upper position to wire 38, pilot light 27, wire 39, wire 34 back through battery and ground as before. The illumination of the pilot lamp 27 will indicate to the driver that the relays are in their re-set inoperative position and that the doors can be opened without setting off the alarm. He then opens one or all of the doors and proceeds to load and unload the vehicle. When he is through and wishes to get in and drive off or close doors and leave the car standing, the following actions take place:

His opening of the door or doors to get into the car to load or unload has established a circuit, as follows: From ground, door arm 11, assuming that is the one which is opened, wire 42, wires 43 and 44, operate coil 13, wire 33 back to battery and ground. This pulls down the arms 18 and 19 to lower position breaking the pilot light circuit. Now when he has finished and closes all doors, the arms 10 and 11 are both up and the upper arm 10 establishes a circuit: From ground, arm 11, wire 35, arm 10, wire 36, arm 19 in lower position, wire 45, coil 14, wire 41 back to battery and ground. This pulls down the arms 20 and 21 and prepares a circuit for the siren 28. Now when either door is opened thereafter the siren will be energized over the following circuit:

Either arm 10 or 11 in lower position, wire 43, arm 18 in lower position, wires 46 and 47, arm 20 in lower position, wires 48 and 49, siren relay 29, wire 39 back to battery. Relay 29 pulls down contact 50 to connect ground to siren which is connected to battery through wire 39 and the siren blows. To keep the siren blowing, even though said door is slammed closed again, the siren lock relay 30 is also and simultaneously energized over wire 48 and pulls down contact 51, which establishes circuit as follows:

Ground, wire 56, contact 51 now closed, wire 52, wire 47, arm 20 down, wire 48, wire 49, relay 29, which holds contact 50 down. The siren may be stopped by operating one of the key operated switches 22 or 23 which energizes the re-set coils 15 and 16 opening the siren circuit at contact arm 20. In the event the re-set coils fail to operate, the siren may also be stopped by opening the master switch 25 thereby disconnecting the battery from the circuit or by opening the switch 100 which will deenergize the siren relay coil 29.

The alarm button 26 when pressed inside the car, will when the doors and relays are in any condition or setting, energize the operate coil 13 over wire 42, and simultaneously the operate coil 14 over wire 53, thereby establishing the circuit to alarm relay 29 and alarm lock relay 30 as hereinbefore described.

In the form of the circuit shown in Fig. 2, the parts are in most instances similar and have been numbered accordingly.

In this instance, however, only a single door is controlled by the mechanism, the other door or doors remaining permanently locked. The parts are shown in the positions with the door switch 11 closed, key switches open, relay coils 13 and 16 energized momentarily and latched in that position, siren contacts open, alarm button open, ignition connected, and pilot light out. This is equivalent to an operating position. In this circuit, however, the connections are somewhat different and will be described. This circuit is simplified and requires fewer switches and relays than the one above set forth.

With the parts as shown, if the operator wishes to get out of or into the vehicle without sounding the alarm, he operates either one of the key-operated switches 22 or 23, which energizes coil 15, which swings arm 21 to the right making a circuit for the pilot lamp 27 as follows: Battery 24 wires 57 and 58, pilot lamp 27, wire 59, arm 21 in right position, wire 60 through wire 69 back to battery. The energization of coil 15 also swings arm 61 to the right, establishing the following circuit: Battery, wire 62, through door switch arm 11, wire 63, through arm 61 in right position, wire 64, coil 16, wire 65 through wire 69 back to battery. This causes coil 16 to swing arm 66 to the left, breaking the circuit to the siren relay 29. Since these relays are of the type which when operated will stay latched in one position until the parts are pulled in the opposite direction by the other coil thereof, there is now the possibility that the door may be opened freely without sounding the alarm. With arms 21, 61, in their righthand positions, the opening of the door and subsequent actuation of switch 11, relay 14 is energized and attracts arm 66 thereto. However, the siren alarm relay coil 29 remains deenergized since the arm of swtch 21 is in its righthand position and the circuit is open at that point.

The resetting of circuit components for alarm operation is accomplished automatically by the closing of the door and subsequent actuation of switch 11. Arm 66 is returned to its lefthand position Fig. 2, by a circuit from battery 24, through wire 62, switch 11, wire 63, the righthand contact and arm 61, wire 64, relay coil 16, wires 65, 69, switch 25, back to the battery, thus energizing relay coil 16 and attracting arm 66 thereto. Simultaneously a second circuit is established that energizes relay coil 13 attracting arm 61 thereto, from battery through wire 62, switch 11, wire 63, relay coil 13, wire 69, switch 25 back to the battery. Arm 21 is likewise returned to the lefthand position by the energizing of coil 13 thereby preparing the alarm circuit which will be completed by the opening of the door and subsequent closing of switch 11. To reopen the vehicle door without sounding the alarm, it is necessary for the driver to momentarily close either of the switches 22, 23.

If, with the parts in the position shown in the drawings, the door is opened without operating one of the key-operated switches, then the following happens.

The door switch is of the well known type in which the contact made in either opening or closing is only momentary but long enough to energize the related switches and relays. Opening the door will swing arm 11 up to contact wire 67 in the open door position, (it being shown in dotted lines in closed door position), thus connecting the battery through wire 62 and door arm contact of switch 11 to wire 67 and coil 14, which pulls arm 66 to the right. As shown in solid lines on Fig. 2, the arm of switch 11 is in normal position, i. e. the door is at rest, either open or closed, and all contacts are open. Only when the door is in the process of opening or closing, will the arm swing into engagement with a related contact. The coil 14 is connected back to battery by wires 68 and 69. Swing of arm 66 to right establishes the following circuit: Battery through master switch 25, wire 69, wire 60, arm 21 in left position, wire 70, arm 66 in right position, wire 71, siren relay coil 29, wire 72, wire 57 back to battery. The coil 29 pulls both arms 54 and 73 to the left, the one opening the ignition wires 55 and 56 and the other connecting wire 57 with wire 74 leading to siren 28 back to battery by way of wire 69. The alarm button 26 which is of the toggle type, will sound the siren by connecting wire 75 to wire 69 on one side and to wire 71 on the other, thus energizing the siren independently of the setting of the relays.

If blowing of siren is caused by alarm button, it may be stopped by throwing the switch to off position. If blowing of siren is caused by opening a door, turning key-switch and then closing the door re-sets circuit for operation. As hereinbefore described, the momentary closing of either switch 22 or 23 will stop the sounding of the siren 28 by ultimately opening the controlling circuit therefor; and the closing of the door resets the alarm circuit.

In the form shown in Fig. 3, the parts are somewhat the same with simple latch relays, plain single-pole double-throw door-switches, but a special relay to give momentary contact for opening and closing of doors is employed. This special relay is a double-pole double-throw latch relay. This circuit in many instances is the same as that shown in Fig. 2. As shown in Fig. 3, switches 10, 11 are illustrated midway on the paths of travel of the respective arms. The normal positions of said arms are the uppermost position when the door is open and the lowermost position when the door is closed. Switches 10, 11 (Fig. 3) differ from the hereinbefore described embodiments in that the contacts thereof remain closed or engaged in accordance with position of the door.

With the parts shown in the drawings, the closed position of the circuit is established with the key-switches open, alarm button open, arms 61 and 66 to the left and door-switch relay contact 79 to right. If any door is opened, momentary current flows over the following circuit: Battery, wire 62, the door arm, wire 80 to arm 79 of door relay, wire 81 through coil 76 of said relay, wire 82, coil 14, wires 83 and 69 back to battery. By this the arm 79 is swung to left, breaking the door contact and arm 66 is swung to right, establishing the siren circuit traced above with respect to Fig. 2. The siren is sounded and the ignition contacts are opened as before. The alarm button in this case operates as before to sound the alarm independent of the relays. To stop the siren from blowing operate a key-switch which establishes a circuit from battery 24, through wire 57, either switch 22 or 23, relay coil 15, wire 69, switch 25, back to battery. Similarly a circuit from battery 24, through wire 57, either switch 22 or 23, the righthand contact and arm 61, relay coil 16, wires 65, 69, switch 25, back to battery which actuates coil 15 and coil 16, swinging arm 66 to the left and breaking the siren circuit at that point, and closes ignition contacts again, and swings arm 21 to right, lighting pilot lamp as before. Doors may then be opened without sounding the alarm. Closing all doors actuates coil 13 and resets the parts for the alarm over the following circuit: Battery, wire 62, through wires connected door arms 10 and 11, wire 84 through arm 78 in left position, wire 85, coil 77 of door relay, wire 86, coil 13, wires 87 and 69 back to battery. Coil 77 swings arm 79 to right as well as arm 78 thus establishing through arm 79 circuit for doors when any one is opened and breaking momentary door contact at arm 78. Coil 13 swings arm 61 to left, thus breaking connection to coil 16. If the alarm is blown by opening a door, it may be stopped by turning key-switch. If the siren is sounded by closing the alarm switch 26, which in this instance is of the toggle type and by-passes the circuit, then the alarm may be stopped by throwing the switch to open position. The special relay is employed to control the door opening and closing contact instead of using the more expensive momentary contact door-switches.

It will be noted in both the forms of Figs. 1 and 3 that the door contacts are in series for closed position and in parallel for open position, which thus prevents re-setting the circuit for the alarm until all the doors are closed and permits it to be sounded when any one door is opened.

It will thus be observed that in all these forms there is an alarm signal, door-switches, key-switches, means for preventing the operation of the alarm when the key-switch is operated, means for preventing the alarm from sounding until all the doors are closed, and means permitting the alarm to sound when any one door is opened. Added to this may be provided the automatic operation of the ignition contacts to shut it off when the alarm is operated and to close it when the circuit is reset. The possibility of neutralizing the circuit from within or without by key switches permits the driver to open the doors from within or without without setting off the alarm. The device is simple and the relay unit is very small and compact and durable and capable of withstanding the rough jars and vibrations of road travel.

In the above circuits only two doors have been illustrated for simplicity, but it will be readily understood that in actual practice any number of doors may be employed.

Further, it may be pointed out that the switch in each door is so constructed that it may be hand operated when desired. This is of material advantage in preventing hold-ups because it is not necessary that the door be operated. In short, if the operator is loading or unloading at any door and he senses danger it is not necessary that he enter the vehicle to get at the alarm button or close a door, he can place his hand on the door switch and, if desired, set off the alarm.

While the invention has been described in detail and with respect to the present preferred forms which the invention may assume, it is not to be limited to such details and forms since many changes and modifications may be made in the invention without departing from the spirit and scope of the invention in its broadest aspects. Hence it is desired to cover any and all forms and modifications which may come within the language or scope of any one or more of the appended claims.

What I claim as my invention, is:

1. In a device of the class described, an alarm means, door-operated switches, key-operated switches, control relays, switches controlled by said relays, means associated with the relays and the key-operated switches to set the relays in inoperative position when either of said key-operated switches is operated, and automatically operated resetting means connected with a power source and said relays and the door-switches actuable upon the closing of all doors to prepare a circuit to said alarm means which will be completed when any door is opened.

2. In a device of the class described, an alarm means, door-operated switches, key-operated switches, control relays, relay-controlled switches, an alarm button, means associated with the relays and the key-operated switches to set the relays in inoperative position when either of said key-operated switches is operated, automatically operated resetting means connected with a power source and said relays and door-operated switches, after all the doors are closed, to establish a circuit to said alarm means when any door is opened and means associated with the alarm button and the relays to sound the alarm when the doors are closed and the alarm button is operated.

3. In a device of the class described, an alarm means, door-operated switches, key-operated switches, control relays, relay-controlled switches, an alarm relay, an alarm lock relay, means associated with the control relays and the key-operated switches to set the control relays in inoperative position when either of said key-operated switches is operated, automatically operated resetting means connected with a power source and said control relays and the door-operated switches, after all the doors are closed, to establish a circuit through said alarm relay and the alarm lock relay when any door is opened to energize the alarm relay and the alarm lock relay to sound and lock the alarm.

4. In a device of the class described, a vehicle, an audible theft alarm therefor, vehicle door-operated switches, key-operated switches, control relays, relay controlled switches, an alarm relay, an alarm lock relay, a power source, means associated with the control relays and key-operated switches to set the control relays in inoperative position when either of said key-operated switches is actuated thereby opening the alarm circuit, and alarm circuit resetting means, including said vehicle door-operated switches, relay controlled switches, and control relays which automatically prepares said alarm circuit upon the closing of the last open door and when any door is opened thereafter, complete said alarm circuit.

5. In a theft alarm for vehicles, an alarm circuit, including an electrically operated alarm, a power source, and an alarm relay controlled switch; a circuit for actuating said alarm switch, including an alarm relay, a power source, a first control relay operated snap switch, and a second control relay operated switch; a circuit for actuating said first control relay operated snap switch, including a control relay, a power source, and a door-operated switch; a circuit for actuating said second control relay operated snap switch including a control relay, a power source, and a second door-operated switch; said first door-operated switch closed momentarily by the opening of a vehicle door completing said circuit for actuating said first control relay operated snap switch thereby completing said alarm relay circuit actuating said alarm relay controlled switch and actuating said alarm; an alarm disabling circuit, including a relay for opening said second control relay operated snap switch, a power source, and a momentary contact key-operated switch; and said second door-operated switch momentarily closed by the closing of a vehicle door completing a circuit for actuating said second control relay operated snap switch preparing the controlling circuit for the said first control relay operated snap switch to be completed on the opening a vehicle door.

SYDNEY MOLEDZKY.

REFERENCES CITED

The following references are of record in the file of this patent:

UNITED STATES PATENTS

| Number | Name | Date |
|---|---|---|
| 1,059,007 | Sharp | Apr. 14, 1913 |
| 1,115,879 | Van Der Kooy | Nov. 3, 1914 |
| 1,201,509 | Schooley | Oct. 17, 1916 |
| 1,238,823 | Roeder | Sept. 4, 1917 |
| 1,290,644 | Nelson | Jan. 7, 1919 |
| 1,372,678 | Eisner | Mar. 29, 1921 |
| 1,840,122 | McShane | Jan. 5, 1932 |
| 2,224,548 | McFerron | Dec. 10, 1940 |
| 2,238,246 | Chapel | Apr. 15, 1941 |
| 2,243,804 | Howton | May 27, 1941 |
| 2,250,828 | Foss | July 29, 1941 |